(12) United States Patent
Seo

(10) Patent No.: US 7,859,953 B2
(45) Date of Patent: Dec. 28, 2010

(54) OPTICAL PICKUP AND OPTICAL DISC APPARATUS

(75) Inventor: Katsuhiro Seo, Kanagawa (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 11/768,616

(22) Filed: Jun. 26, 2007

(65) Prior Publication Data

US 2008/0008059 A1 Jan. 10, 2008

(30) Foreign Application Priority Data

Jul. 10, 2006 (JP) ............................. 2006-189364

(51) Int. Cl.
*G11B 7/12* (2006.01)
(52) U.S. Cl. .............................. 369/44.23; 369/112.18; 369/116
(58) Field of Classification Search ........................ None
See application file for complete search history.

(56) References Cited

U.S. PATENT DOCUMENTS

2003/0053398 A1* 3/2003 Nakamura et al. ..... 369/112.19

2003/0169667 A1 9/2003 Nishi et al.
2006/0018236 A1* 1/2006 Matsumoto et al. .... 369/112.01

FOREIGN PATENT DOCUMENTS

JP 2002-260272 9/2002
JP 2003-157566 5/2003

* cited by examiner

*Primary Examiner*—Wayne R Young
*Assistant Examiner*—Brian Butcher
(74) *Attorney, Agent, or Firm*—Oblon, Spivak, McClelland, Maier & Neustadt, L.L.P.

(57) ABSTRACT

An optical pickup includes: a light source; an objective lens; a beam splitter; a quarter wave plate that transforms the optical beam into a circularly polarized optical beam and also transforms the circularly polarized reflection optical beam into an optical beam whose polarization direction is perpendicular to the optical beam; a light detector; a neutral density filter section placed on a mutual optical path of those beams, reducing the intensity of the optical beam while maintaining the intensity of the reflection optical beam; and a filter drive section that puts the neutral density filter section in the mutual optical path or outside of it, wherein the intensity of the optical beam and the filter drive section are controlled such that the amount of the optical beam emitted to the optical disc is maintained at a predetermined level.

10 Claims, 8 Drawing Sheets

PASSING OF OPTICAL BEAM

PASSING OF REFLECTION OPTICAL BEAM

OPTICAL PICKUP AND OPTICAL DISC APPARATUS

CROSS REFERENCES TO RELATED APPLICATIONS

The present invention contains subject matter related to Japanese Patent Application JP 2006-189364 filed in the Japanese Patent Office on Jul. 10, 2006, the entire contents of which being incorporated herein by reference.

BACKGROUND OF THE INVENTION

1. Field of the Invention

The present invention relates to an optical pickup and an optical disc apparatus, and is preferably applied to an optical disc apparatus including an optical pickup in which a laser diode and a light detector are closely disposed or in which a laser diode and a beam splitter are closely disposed, for example.

2. Description of Related Art

An optical pickup is usually equipped with a laser diode. The laser diode is selected such that its rating is appropriate for recording: recording of information may require more intense emission light than reproduction of information.

The optical pickup may need to dramatically decrease the output power of the laser diode when reproducing information, to reduce the intensity of the emission light. However, decreasing the output power of the laser diode increases noise levels compared to the intensity of the optical beam emitted.

Accordingly, Patent Document 1 (Jpn. Pat. Laid-open Publication No. 2002-260272) discloses an optical pickup 1 equipped with a tunable filter 2 as shown in FIG. 1. The tunable filter 2 includes a high transmission section with substantially 100% transmission and a neutral density filter section that shuts down part of the optical beam. When recording information, the optical pickup 1 uses the high transmission section through which the optical beam passes, to increase the intensity of the emission light. When reproducing information, the optical pickup 1 uses the neutral density filter section through which the optical beam passes, to decrease the intensity of the emission light. This allows the optical pickup 1 to use the high-power laser diode even when reproducing information. The noise level is therefore well controlled.

The optical pickup 1 includes a laser diode 11 and a beam splitter 17. The tunable filter 2 is placed between the laser diode 11 and the beam splitter 17. During the reproduction process, the optical beam 40 emitted from the laser diode 11 passes through the neutral density filter section of the tunable filter 2. This decreases the intensity of the optical beam 40. A reflection optical beam 50, a beam reflected on an optical disc 100 changes its direction in the beam splitter 17 and reaches a light detector 22 without passing through the tunable filter 2. Accordingly, the intensity of the reflection optical beam 50 is not reduced.

SUMMARY OF THE INVENTION

In recent years, the optical pickup 1 has been downsized: downsized components are collectively integrated into one package as an optical integrated circuit. As shown in FIG. 2, the optical integrated circuit 4 includes the laser diode 11, the light detector 22 and other adjacent components.

When the optical pickup 1 is equipped with the optical integrated circuit 4, the tunable filter 2 may be placed between the optical integrated circuit 4 and an objective lens 20. It means that the tunable filter 2 is placed on the mutual optical path of the optical beam 40 and the reflection optical beam 50.

That means that both the optical beam 40 and the reflection optical beam 50 pass through the tunable filter 2. That is, the reflection optical beam 50 passes through the neutral density filter section during the reproduction process. As a result, the intensity of the reflection optical beam 50 to be received by the light detector 22 is decreased, deteriorating its reproducing characteristics.

The present invention has been made in view of the above points and is intended to provide an optical pickup and an optical disc apparatus with good reproducing characteristics even when its neutral density filter section is placed on the mutual optical path of the optical beam and the reflection optical beam.

In one aspect of the present invention, an optical pickup includes: a light source that emits an linearly polarized optical beam; an objective lens that collects the optical beam to irradiate the optical beam to an optical disc and receives a reflection optical beam reflected from the optical disc; a beam splitter that divides the optical beam and the reflection optical beam; a quarter wave plate that transforms the optical beam from the beam splitter into a circularly polarized optical beam and also transforms the circularly polarized reflection optical beam into an optical beam whose polarization direction is perpendicular to the optical beam before the reflection optical beam reaches the beam splitter; a light detector that receives the divided reflection optical beam; a neutral density filter section placed on a mutual optical path of the optical beam and reflection optical beam, the neutral density filter section leading, after reducing the intensity of the optical beam by exploiting a difference of polarization directions between the optical beam and the reflection optical beam, the optical beam to the objective lens while maintaining the intensity of the reflection optical beam which is then irradiated to the light detector; and a filter drive section that puts the neutral density filter section in the optical path of the optical beam and reflection optical beam or outside of the optical path, wherein the intensity of the optical beam from the light source and the filter drive section are controlled such that the amount of the optical beam emitted to the optical disc is maintained at a predetermined level.

Accordingly, only the intensity of the optical beam emitted to the optical disc can be reduced when placing the neutral density filter section in the optical path. This allows the neutral density filter section to be placed in the mutual optical path of the optical beam and the reflection optical beam.

In this manner, only the intensity of the optical beam emitted to the optical disc can be reduced when placing the neutral density filter section in the optical path. Thus, the optical pickup and the optical disc apparatus according to an embodiment of the present invention present good reproducing characteristic even when the neutral density filter section is placed in the mutual optical path of the optical beam and the reflection optical beam.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

(1) Overall Configuration of an Optical Disc Apparatus

Figure 1:
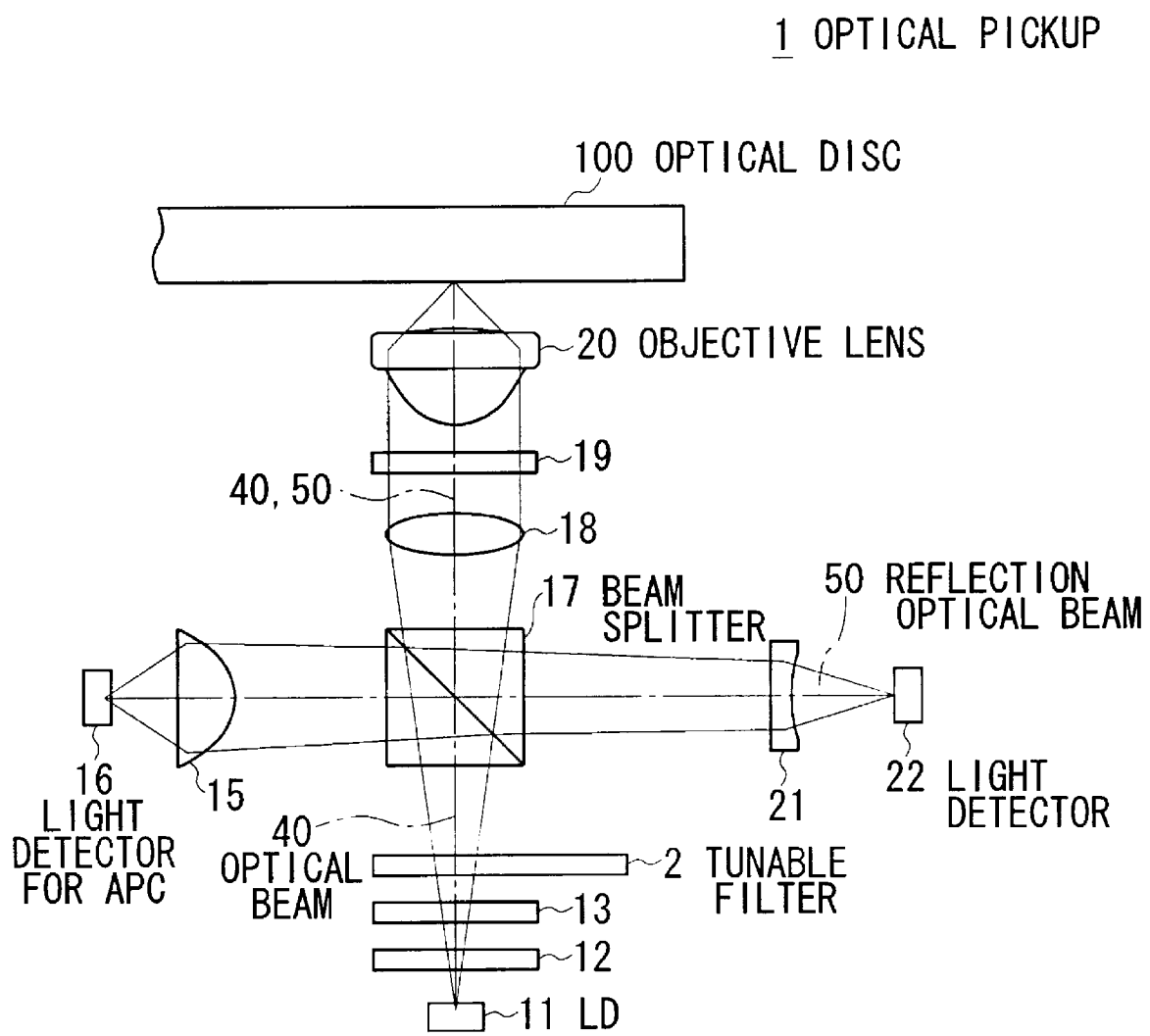
FIG. 1 is a schematic diagram illustrating the configuration of a general optical pickup.
Figure 2:
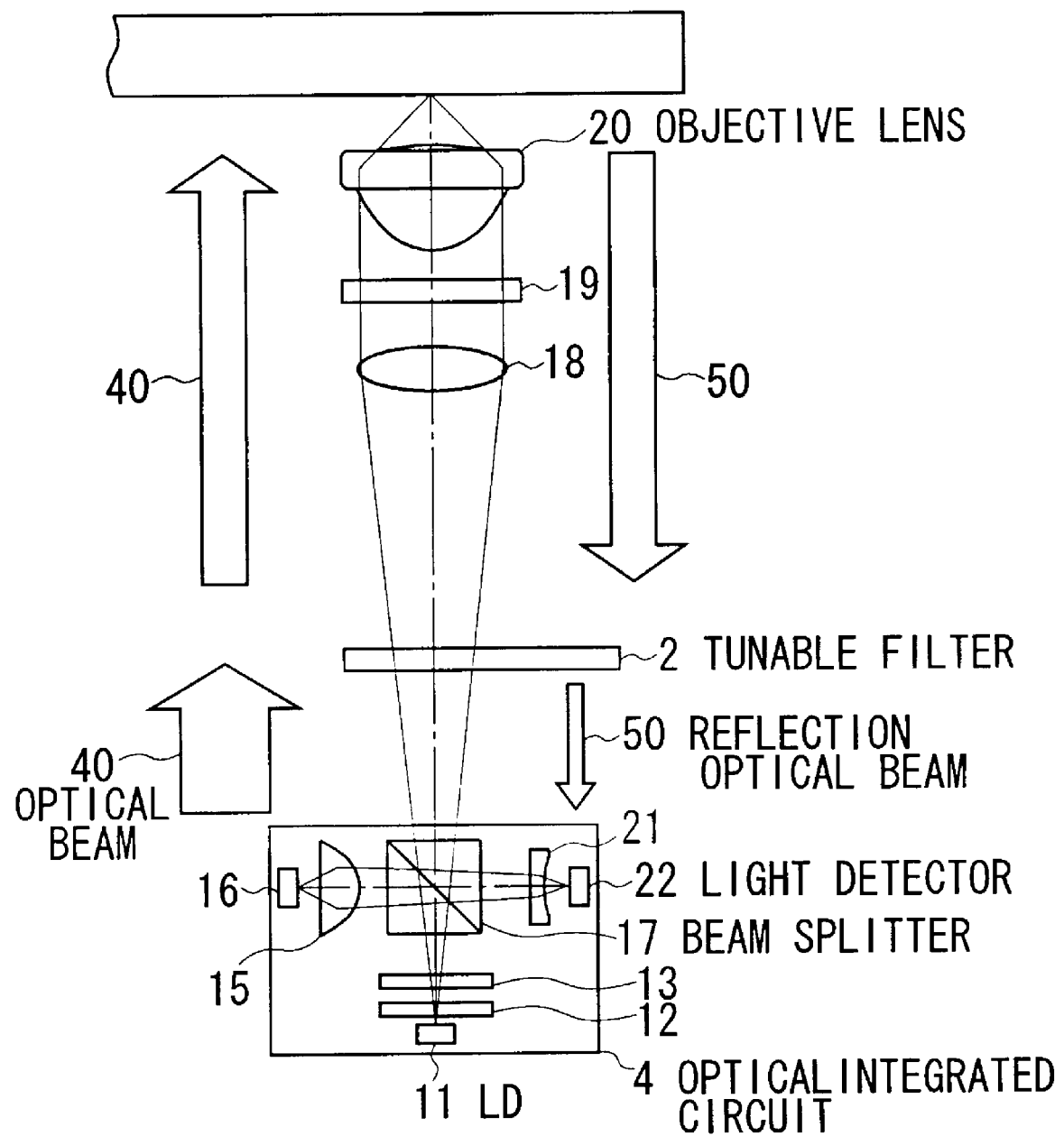
FIG. 2 is a schematic diagram illustrating depletion of a reflection optical beam due to the position of a tunable filter.
Figure 3:
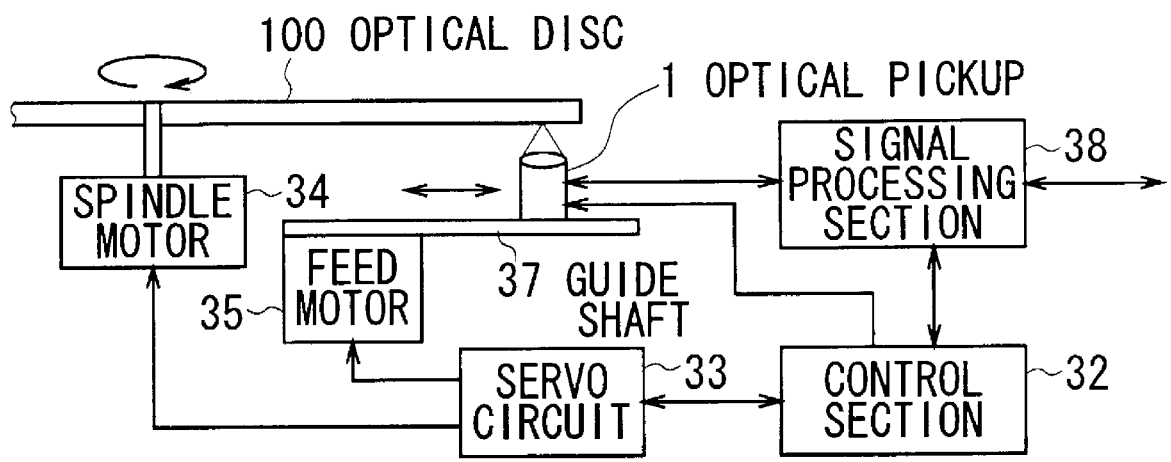
FIG. 3 is a schematic diagram illustrating the overall configuration of an optical disc apparatus.

In FIG. 3, the reference numeral 3 denotes an optical disc apparatus as a whole. The parts of FIG. 3 are represented as the same reference numerals and symbols as the corresponding parts of FIGS. 1 and 2. The optical disc apparatus 3 supports two types of the optical disc 100: an one layer disc 100a, such as Compact Disc (CD), including one signal recording layer; and a two layer optical disc 100b, such as "Blu-ray Disc (BD) (Registered Trademark)", including two signal recording layers.

A control section 32 controls components of the optical disc apparatus 3. The control section 32 includes Central Processing Unit (CPU), Read Only Memory (ROM) in which various programs are stored, and Random Access Memory (RAM) which serves as a work memory for the CPU.

The control section 32 controls a servo circuit 33 to drive a spindle motor 34. This rotates the optical disc 100 held by a turntable (not shown). The control section 32 also controls the servo circuit 33 to drive a feed motor 35. This moves the optical pickup 1 along a guide shaft 37 in a radial direction of the optical disc 100 (or in a tracing direction). The control section 32 controls the optical pickup 1 to record or reproduce information from the optical disc 100.

Figure 4:
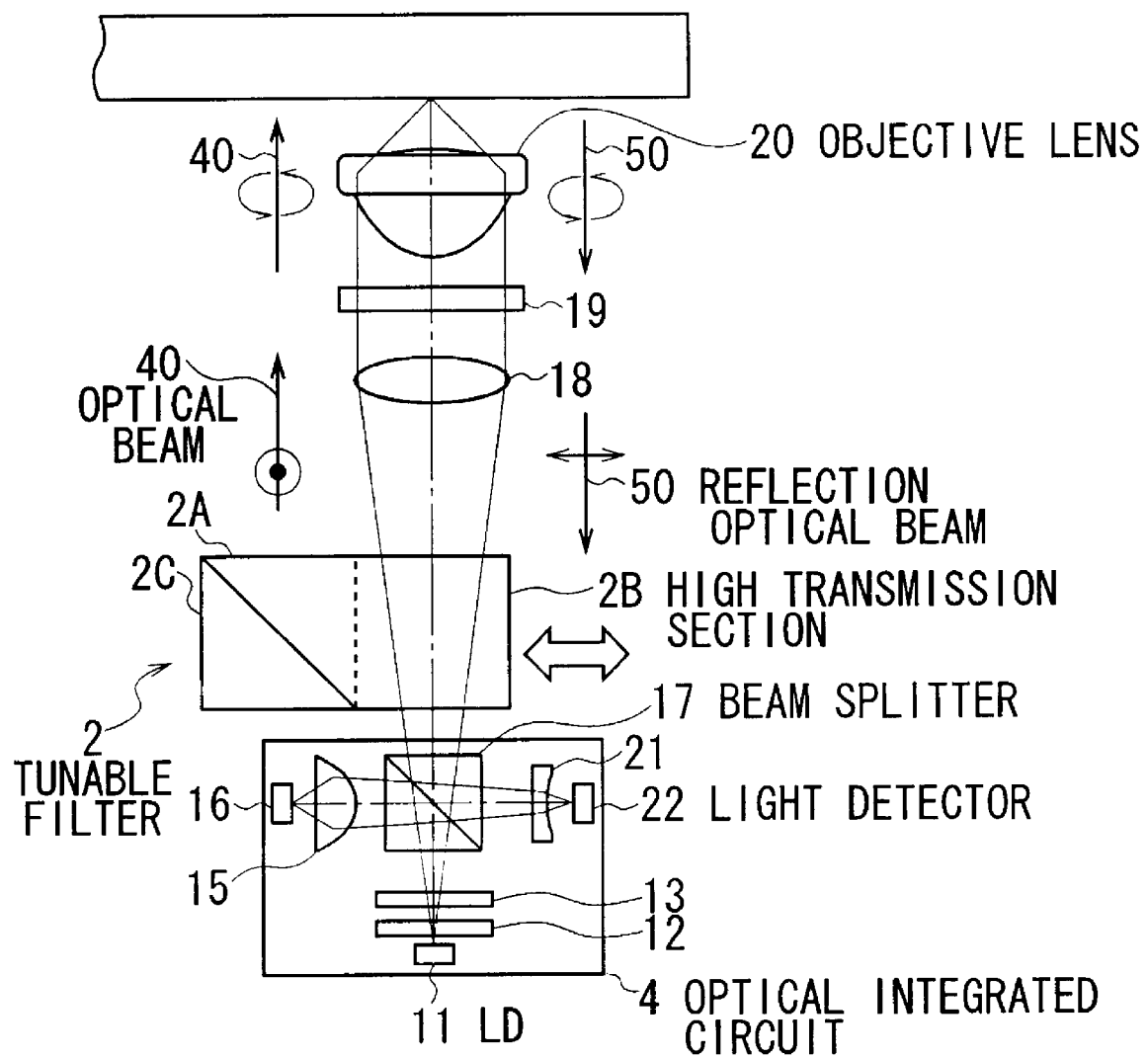
FIG. 4 is a schematic diagram illustrating the position of a tunable filter for a recording process.

As shown in FIG. 4, the laser diode 11 of the optical pickup 1 emits a laser beam, or an optical beam 40, whose wavelength is suitable for the type of the optical disc 100. The intensity of the optical beam 40 varies according to a drive current supplied from the control section 32. The optical beam 40 passes through a half-wave plate 12 toward a diffraction element 13.

The diffraction element 13 divides the optical beam 40 into two beams, one of which is a main beam to be used for reproducing and recording on the optical disc 100, the other of which is a sub beam to be used for generating various tracking control signals. The main beam and the sub beam enter the beam splitter 17 as the optical beam 40.

The beam splitter 17 allows most of the optical beam 40 to pass through it toward the tunable filter 2. The tunable filter 2 controls the intensity of the optical beam 40 for the recording or reproducing process (described below), and then the optical beam 40 enters a collimator lens 18. The collimator lens 18 collimates the divergent optical beam 40, and then the optical beam 40 enters a quarter-wave plate 19.

The quarter-wave plate 19 transforms the s-polarized optical beam 40 into the circular-polarized optical beam 40 which then enters the objective lens 20. The objective lens 20 collects the optical beam 40 and supplies it to the optical disc 100.

The optical beam 40 is reflected on the optical disc 100, and then it is received by the objective lens 20 as the reflection optical beam 50. The optical beam 50 subsequently enters the quarter-wave plate 19. The quarter-wave plate 19 transforms the circular-polarized optical beam 50 into the linear-polarized (or p-polarized) optical beam 50. The optical beam 50 subsequently passes through the collimator lens 18 and the tunable filter 2 toward the beam splitter 17.

The reflection optical beam 50 is then reflected on a polarization plane of the beam splitter 17 to change its direction by 90 degrees. The reflection optical beam 50 subsequently passes through a multi lens 21 for aberration correction and then reaches the light detector 22. The light detector 22 photoelectrically converts the reflection optical beam 50 to generate a detection signal which is then supplied to a signal processing section 38 (FIG. 3).

The signal processing section 38 produces, based on the detection signal, a reproduction RF signal and various servo control signals. Based on the servo control signal supplied from the signal processing section 38, the control section 32 generates a drive control signal to control the objective lens 20. The objective lens 20 therefore operates in the focus and tracking directions such that the optical beam 40 is focused on an appropriate track of the optical disc 100.

In addition, the polarization plane of the beam splitter 17 (FIG. 4) extracts part of the optical beam 40 at a predetermined rate. The extracted part of the optical beam 40 then reaches an Auto Power Control (APC) light detector 16 through an APC lens 15. The APC light detector 16 detects the intensity of the beam 40 to generate an APC detection current which is then supplied to the control section 32.

To keep the APC detection current at a predetermined level, the control section 32 controls the drive current supplied to the laser diode 11. In this manner, the control section 32 adjusts the output of the laser diode 11. Thus, the intensity of the optical beam 40 emitted from the laser diode 11 is adjusted to be a predetermined level which is suitable for the type of the optical disc 100 or the recording and reproducing processes. The intensity of the optical beam 40 emitted from the laser diode 11 is also referred to as an "outgoing light intensity".

The control section 32 controls the output of the laser diode 11 such that the intensity of the light emitted to the optical disc 100 for the recording process is stronger than is that for the reproducing process. In addition, the control section 32 controls the output of the laser diode 11 such that the intensity of the optical beam 40 emitted to the two layer disc 100b is stronger than the beam 40 emitted to the one layer disc 100a. This is because the loss of the optical beam 40 in the signal recording layers of the two layer disc 100b is much larger than that of the one layer disc 100a.

In this manner, the optical disc apparatus 3 records and reproduces information from the optical disc 100.

By the way, the s-polarized and p-polarized light usually refers to the polarization directions with respect to a polarization plane 2Ca of the tunable filter 2. In addition, to illustrate the internal configuration, the optical integrated circuit 4 has been rotated, in FIGS. 4 and 6, by 90 degrees from the actual position around the optical path which extends from the laser diode 11 to the optical disc 100.

The tunable filter 2 of the optical pickup 1 includes the high transmission section 2B, which is used for the recording process, and the neutral density filter section 2C, which is used for the reproduction process. The tunable filter 2 is located between the beam splitter 17 and the objective lens 20.

Accordingly, as shown in FIG. 4, the optical beam 40 emitted from the laser diode 11 passes through the tunable filter 2 before being focused on the optical disc 100. The reflection optical beam 50, a beam reflected on the optical disc 100 passes through the tunable filter 2 again.

When the typical tunable filter 2 (FIG. 1) is applied, the optical beam 40 passes through the neutral density filter section 2C during the reproduction process, reducing its intensity. The intensity of the reflection optical beam 50, which also passes through the neutral density filter section 2C, drops accordingly.

On the other hand, the neutral density filter 2C of the optical pickup 1 according to an embodiment of the present invention selectively controls the intensity of the optical beam 40.

(2) Configuration of the Tunable Filter

The configuration of the tunable filter 2 will be described. The neutral density filter section 2C reduces the intensity of the optical beam 40 while maintaining the intensity of the reflection optical beam 50, based on the following characteristics: the optical beam 40 is the s-polarized light while the reflection optical beam 50 is the p-polarized light.

Figure 5A:
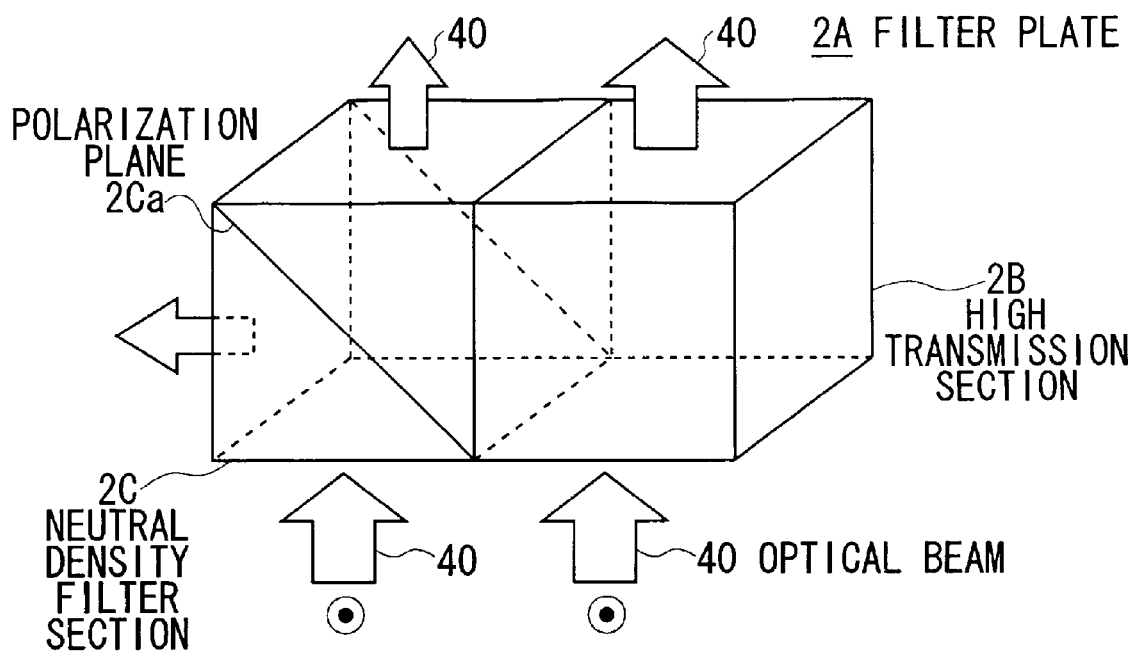
FIGS. 5A and 5B are schematic diagrams illustrating effect of a filter plate.
Figure 5B:
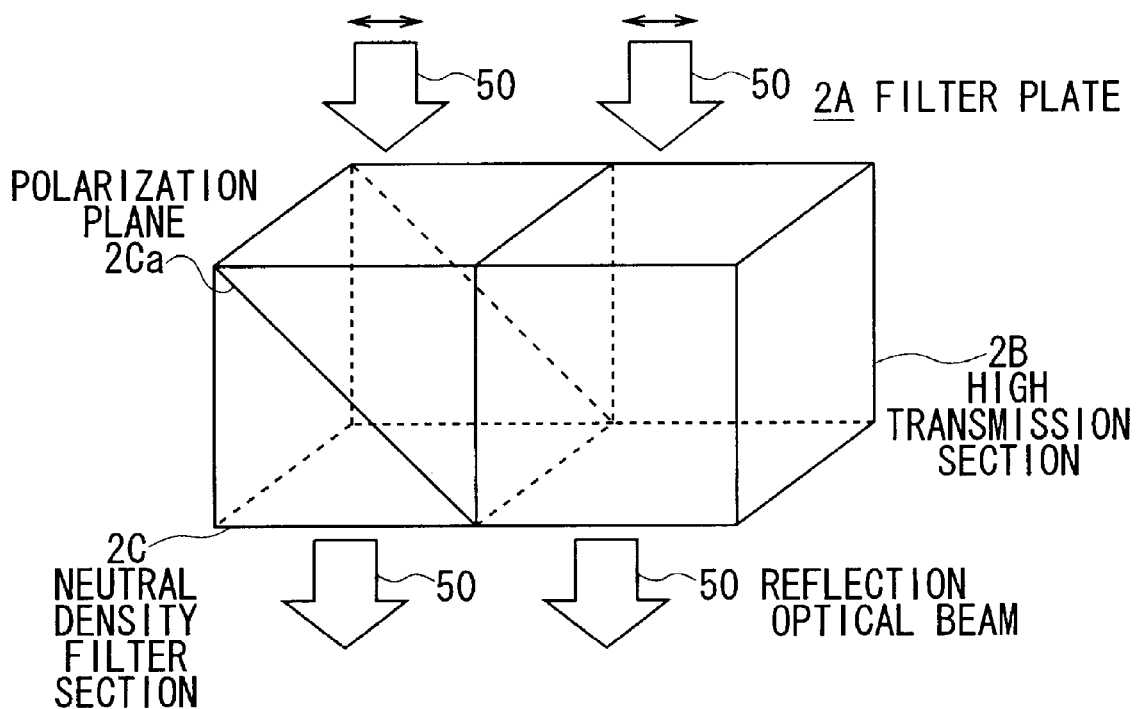

The tunable filter 2 includes a filter plate 2A and an electromagnetic actuator (now shown). As shown in FIGS. 5A and 5B, the filter plate 2A includes the high transmission section 2B, which allows most of the optical beam 40 to pass through it, and the neutral density filter section 2C, which shuts down part of the optical beam 40. The tunable filter 2 controls the filter plate 2A based on the drive current supplied from the control section 32 such that the optical beam 40 passes through either the high transmission section 2B or the neutral density filter section 2C.

The high transmission section 2B is a prism which is substantially a cube in shape. Regardless of the polarization directions, the high transmission section 2B allows most of the optical beam to pass through it without reducing its intensity. Accordingly, the high transmission section 2B does not reduce the intensity of s-polarized optical beam 40 and p-polarized reflection optical beam 50 even if they pass through the high transmission section 2B.

The neutral density filter section 2C is the combination of two triangular prisms. Between the prisms is the polarization plane 2Ca. The polarization plane 2Ca reflects about 50% of the s-polarized optical beam while allowing the rest of the beam to pass through it. On the other hand, the p-polarized optical beam passes through the polarization plane 2Ca without reducing its intensity. That is, the neutral density filter section 2C cuts about 50% of the s-polarized optical beam 40 while maintaining the intensity of the p-polarized reflection optical beam 50.

During the recording process, the control section 32 controls the filter plate 2A, as shown in FIG. 4, such that the optical beam 40 and the reflection optical beam 50 pass through the high transmission section 2B.

The optical beam 40 from the beam splitter 17 therefore passes through the high transmission section 2B without losing its intensity and then enters the collimator lens 18. The reflection optical beam 50 from the collimator lens 18 passes through the high transmission section 2B without losing its intensity and then enters the beam splitter 17.

In this manner, the optical pickup 1 maintains the intensity of the optical beam 40 passing through the tunable filter 2 for the recording process which may require a large amount of the emission light.

Figure 6:
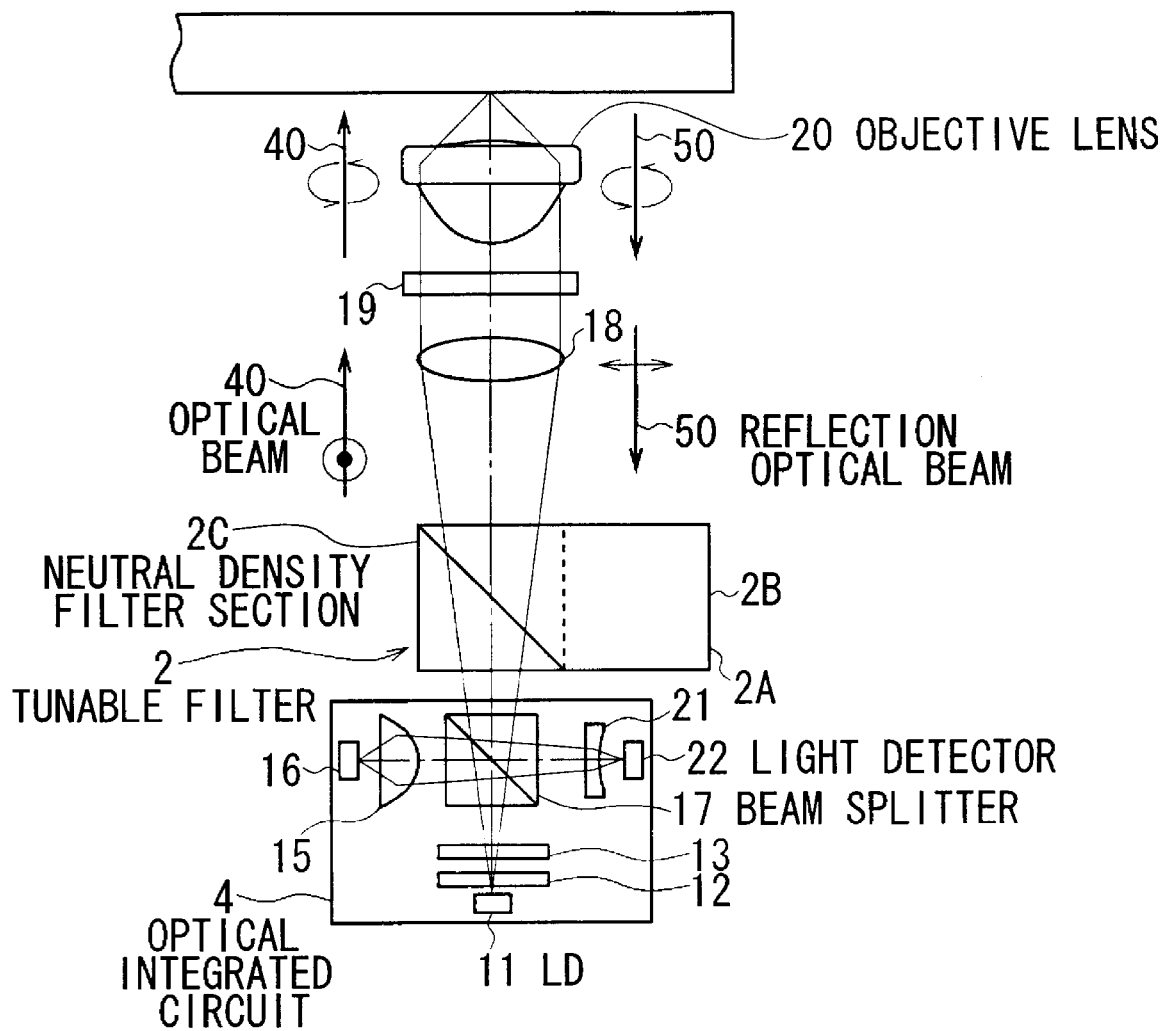
FIG. 6 is a schematic diagram illustrating the position of the tunable filter for a reproduction process.

During the reproduction process, the control section 32 controls the filter plate 2A, as shown in FIG. 6, such that the optical beam 40 and the reflection optical beam 50 pass through the neutral density filter section 2C.

The neutral density filter section 2C cuts about 50% of the optical beam 40 coming from the beam splitter 17. In this manner, the neutral density filter section 2C reduces the intensity of the optical beam 40 which is then supplied to the collimator lens 18.

That means that the control section 32 can make the outgoing light intensity from the laser diode 11 about two times larger than when not using the tunable filter 2. Accordingly, the Signal to Noise ratio of the optical beam 40 increases.

Moreover, the neutral density filter section 2C reflects the remaining 50% of the optical beam 40 and changes its direction by 90 degrees. This prevents the optical beam 40, reflected by the neutral density filter section 2C, from returning to the laser diode 11.

On the other hand, the reflection optical beam 50 supplied from the collimator lens 18 passes through the neutral density filter section 2C without losing its intensity, and then enters the beam splitter 17. Accordingly, the intensity of the reflection optical beam 50 to be received by the light detector 22 is maintained. This maintains the quality of the reproduction RF signal and various servo control signals, which are reproduced based on the detection result of the light detector 22.

In this manner, the neutral density filter section 2C uses the characteristics (or the polarization directions) of the optical beam 40 and reflection optical beam 50: the polarization plane 2Ca of the neutral density filter section 2C reflects part of the optical beam 40 to cut its intensity while maintaining the intensity of the reflection optical beam 50. This allows the laser diode 11 to drive at the high power level even when reproducing information from the optical disc 100. The intensity of the reflection optical beam 50 to be received by the light detector 22 is also maintained.

(3) Operation and Effect

The neutral density filter section 2C of the tunable filter 2 of the optical pickup 1 according to an embodiment of the present invention uses the characteristics of the s-polarized optical beam 40 and the p-polarized reflection optical beam 50: the polarization plane 2Ca of the neutral density filter section 2C reduces the intensity of the optical beam 40, which then passes through the diffraction element 13 toward the objective lens 20, while maintaining the intensity of the reflection optical beam 50, which then passes through the beam splitter 17 toward the light detector 22.

That only reduces the intensity of the optical beam 40 even when the neutral density filter section 2C is located on the optical paths of the optical beam 40 and reflection optical beam 50. Regardless of the position of the beam splitter 17 that divides the optical beam 40 and the reflection optical beam 50, the tunable filter 2 including the neutral density filter section 2C can be disposed wherever between the laser diode 11 and the objective lens 20. Accordingly, even if the laser diode 11 and the light detector 22 (or the laser diode 11 and the beam splitter 17) are closely placed in the optical integrated circuit 4, the tunable filter 2 can be appropriately disposed inside the optical pickup 1.

In addition, the neutral density filter section 2C reflects about 50% of the optical beam 40 to reduce its intensity and also changes the direction of the reflected beam 40 by 90 degrees. Accordingly, the reflected beam 40 deviates from the optical path of the optical beam 40 emitted from the laser diode 11. This prevents the reflected optical beam 40 from returning to the laser diode 11.

According to the above configuration, the neutral density filter section 2C of the tunable filter 2 of the optical pickup 1 selectively reduces, during the reproduction process, the intensity of the s-polarized optical beam 40 while maintaining the intensity of the p-polarized reflection optical beam 50. In this manner, the intensity of the reflection optical beam 50 is maintained regardless of the position of the tunable filter 2 even when the laser diode 11 is driven at a high power level. Accordingly, the optical pickup and the optical disc apparatus present good characteristic even though the neutral density filter section 2C is located on the mutual optical path of both the optical beam 40 and the reflection optical beam 50 while the laser diode 11 and the beam splitter 17 are closely placed.

(4) Other Embodiment

In the above-noted embodiment, the polarization plane 2Ca, a boundary plane between the two triangular prisms reflects part of the optical beam 40 and then changes its direction. However, the present invention is not limited to this. The optical disc apparatus may use polarization dependant diffraction elements, such as sub-wavelength gratings (whose grating pitch is almost equal or less than the wavelength), photonic crystal with the configuration of sub-wavelength gratings or birefringent materials. This presents the same effect as the above-noted embodiments.

Figure 7A:
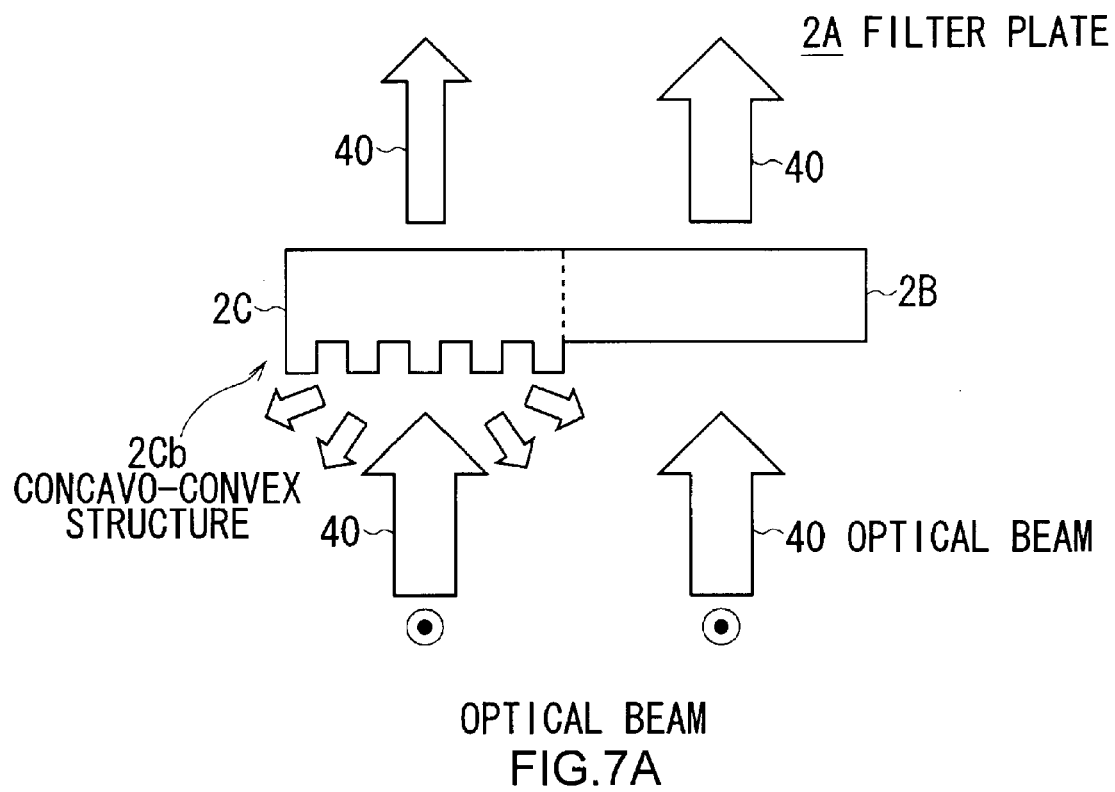
FIGS. 7A and 7B are schematic diagrams illustrating the configuration of a filter plate according to another embodiment of the present invention.
Figure 7B:
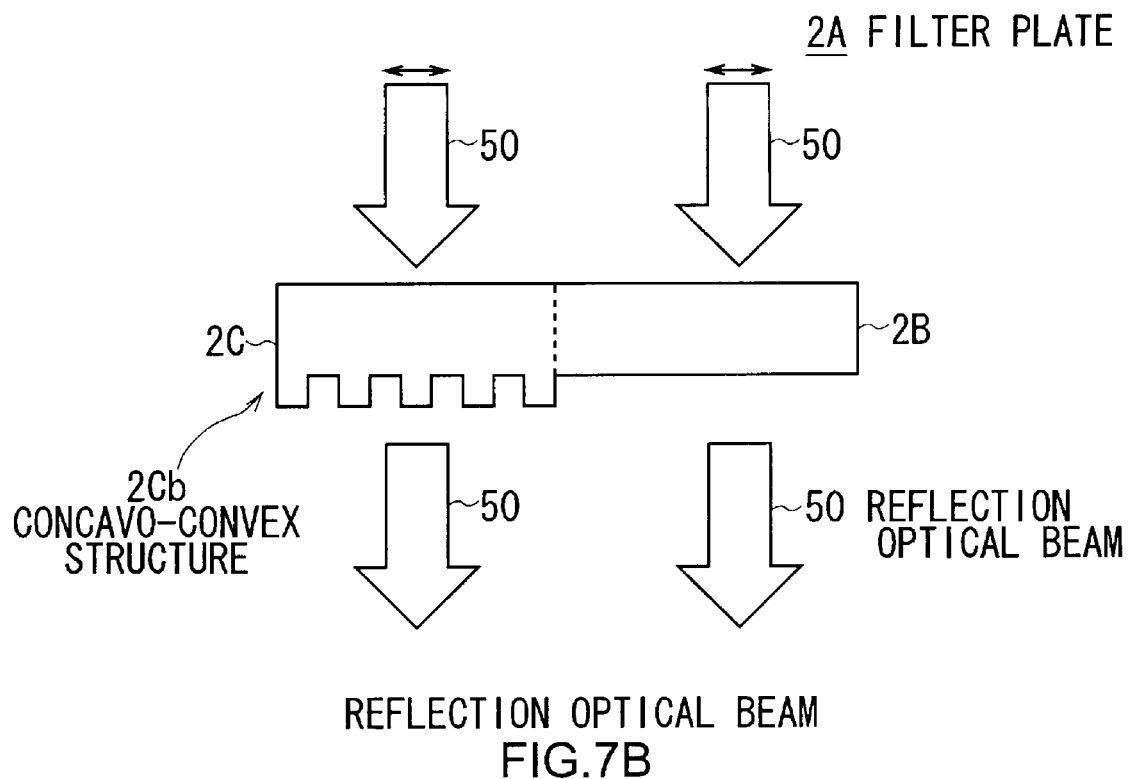

As the sub-wavelength gratings, the neutral density filter section 2C may have, as shown in FIGS. 7A and 7B, a concavo-convex structure 2Cb, which reflects part of the optical beam 40 as well as diffracting and scattering the reflected beam 40. For example, the following structure makes the transmittance of a TM wave perpendicular to the concavo-convex structure 2Cb about 98% while making the transmittance of a TE wave parallel to the concavo-convex structure 2Cb about 80%: the refraction index of the neutral density filter section 2C is approximately 1.5; the pitch, or interval, of the concavo-convex structure 2Cb is around 60% of the wavelength of the optical beam 40; and the depth of the concavo-convex structure 2Cb is about 20% of the wavelength of the optical beam.

In addition, the following structure makes the transmittance of the TM wave about 72% while making the transmittance of the TE wave about 97%: the pitch is the same as the above; and the depth of the concavo-convex structure 2Cb is about 115% of the wavelength of the optical beam 40. In this case, it is disposed such that the polarization directions of the optical beam 40 and reflection optical beam 50 become opposite to those in FIGS. 7A and 7B, and this presents the same effect as the above-noted embodiments. By the way, those transmittances are freely designed by changing the depth and pitch of the concavo-convex structure 2Cb and the refraction index of the neutral density filter section 2C.

When using the polarization dependant diffraction elements made from the birefringent materials as the neutral density filter section 2C, it is designed to only diffract the optical beam 40 while not affecting the reflection optical beam 50. This presents the same effect as the above-noted embodiments. In this case, there is a possibility that the light diffracted by the diffraction element may reach the optical disc 100 and may be focused on the optical disc 100. Accordingly, the diffraction element may be equipped with the characteristic of the Fresnel lens or other characteristics that may cause aberration to make the beam spot dim. This prevents the diffracted light from being focused on the optical disc 100.

Moreover, in the above-noted embodiment, the transmittance of the neutral density filter section 2C to the p-polarized and s-polarized optical beams is changed to reduce the intensity of the optical beam 40 while maintaining the intensity of the reflection optical beam 50. However, the present invention is not limited to this. Alternatively, the reflectance of the neutral density filter section 2C to the p-polarized and s-polarized optical beams may be changed.

Figure 8A:
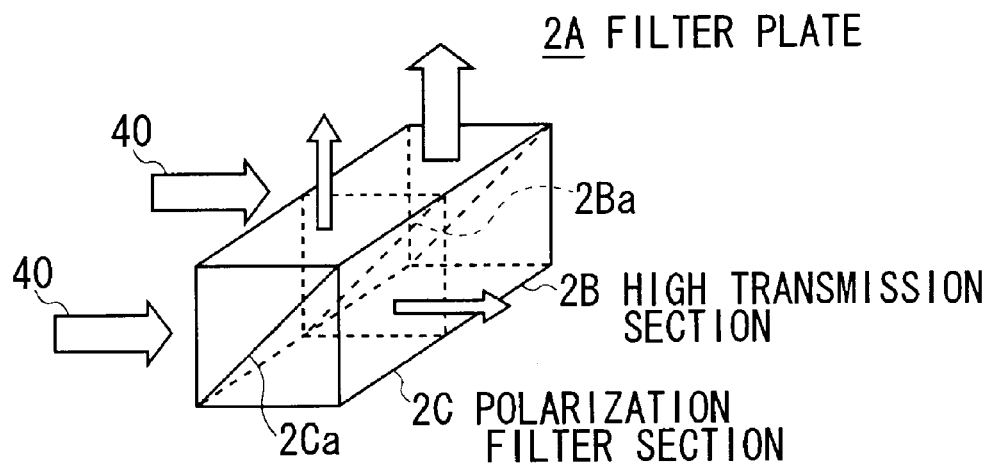
FIGS. 8A and 8B are schematic diagrams illustrating the configuration of a tunable filter according to another embodiment of the present invention.
Figure 8B:
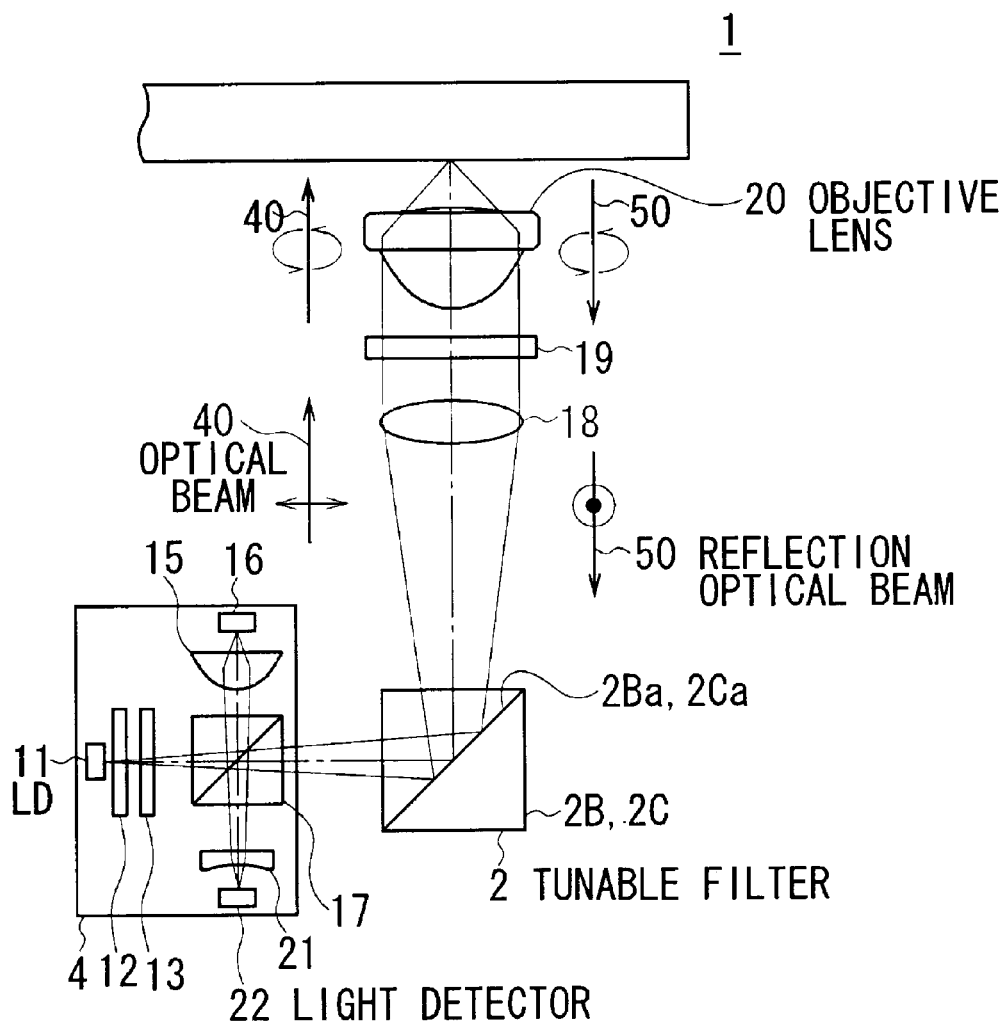

In that case, as shown in FIGS. 8A and 8B, the high transmission section 2B including two triangular prisms may have a high reflectance layer 2Ba on a boundary plane between the two prisms, which strongly reflects the optical beam regardless of its polarization direction. In addition, the neutral density filter section 2C including the two triangular prisms may have a polarization layer 2Ca on the boundary plane between the two prisms, which about 50% of the p-polarized optical beam 40 passes through while the rest of it is reflected and which strongly reflects the s-polarized reflection optical beam 50. In this case, the tunable filter 2 may be placed such that it deflects the optical beam 40 from the laser diode 11 by 90 degrees. This presents the same effect as the above-noted embodiment.

Furthermore, in the above-noted embodiment, the optical integrated circuit 4 is used in the optical pickup 1. However, the present invention is not limited to this. The method according to the embodiments of the present invention may be applied to other configurations, such as an optical pickup 1 in which the tunable filter 2 may not be able to be placed between the laser diode 11 and the beam splitter 17. Nevertheless, even this can present the same effect as the above-noted embodiments.

Furthermore, in the above-noted embodiment, the optical disc apparatus 3 supports two types of the optical disc 100: the one layer disc 100a and the two layer optical disc 100b. However, the present invention is not limited to this. The optical disc apparatus may support one of them. Nonetheless, this can present the same effect as the above-noted embodiments.

Furthermore, in the above-noted embodiment, the optical disc apparatus 3 selects either the high transmission section 2B or the neutral density filter section 2C for the recording or reproducing process: it maintains the intensity of the optical beam 40 for the recording process while reducing the intensity of the optical beam 40 for the reproduction process. However, the present invention is not limited to this. The optical disc apparatus may select, in accordance with the type of the optical disc 100, either the high transmission section 2B or the neutral density filter section 2C: it maintains the intensity of the optical beam 40 for the optical disc 100 that may require a large amount of emission light while reducing the intensity of the optical beam 40 for the optical disc 100 that may need a small amount of emission light.

Furthermore, in the above-noted embodiment, the beam splitter 17, a prism-type splitter with an optical thin film is used to divide the optical beam 40 emitted to the optical disc 100 and the reflection optical beam 50 from the optical disc 100. However, the present invention is not limited to this. Polarization dependant diffraction gratings may be used as the beam splitter 17: this beam splitter 17 may not diffract the optical beam 40 due to its polarization direction and other factors while diffracting the reflection optical beam 50 toward the light detector 22.

Furthermore, in the above-noted embodiment, because the optical integrated circuit 4 is applied, the laser diode 11 and the light detector 22 are closely placed. However, the present invention is not limited to this. The method according to the embodiments of the present invention may be applied to an optical pickup in which there is not enough space for dividing the optical beam 40 and the reflection optical beam 50: the method is for example applied to an optical pickup, which uses the polarization dependant diffraction elements as the beam splitter 14 and which only diffracts the reflection optical beam 50 to lead it toward the light detector 22. In this case, the neutral density filter section 2C is disposed between the laser diode 11 and the beam splitter 17: the neutral density filter section 2C is located before the point where the optical beam 40 and the reflection optical beam 50 part, that is, the neutral density filter section 2C is located on the mutual optical path of the optical beam 40 and the reflection optical beam 50. This presents the same effect as the above-noted embodiments.

Furthermore, in the above-noted embodiment, the optical disc apparatus 3 includes: the laser diode 11, which is equivalent to a light source; the objective lens 20; the beam splitter 17; the light detector 22; the neutral density filter section 2C; the electromagnetic actuator, which is equivalent to a filter drive section; and the control section 32, which is equivalent to an emission light intensity control section. However, the present invention is not limited to this. The optical disc apparatus may be configured in a different manner with the light source, the objective lens, the beam splitter, the light detector, the neutral density filter section, the filter drive section and the emission light intensity control section.

The optical pickup according to an embodiment of the present invention can be applied to various optical disc drives mounted on electronics devices.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
   a light source to emit a linearly polarized optical beam;
   an objective lens to collect and irradiate the optical beam to an optical disc and to receive a reflection optical beam reflected from the optical disc, the objective lens being fixed within an optical path of the optical beam and reflection optical beam;
   a beam splitter to divide the optical beam and the reflection optical beam;
   a quarter wave plate to transform the optical beam from the beam splitter into a circularly polarized optical beam and to transform the reflected circularly polarized optical beam into an optical beam perpendicularly polarized with respect to the reflection optical beam;
   a light detector to receive the divided reflection optical beam;
   a tunable filter to direct the optical beam to the objective lens and to irradiate the reflection optical beam to the light detector, the tunable filter including
      a high transmission section to maintain the intensity of both the optical beam and the reflection optical beam through entire surface areas of each of at least two sides of the high transmission section, and
      a neutral density filter section to reduce the intensity of the optical beam using a difference of polarization directions between the optical beam and the reflection optical beam while maintaining the intensity of the reflection optical beam; and
   a filter drive section to position the high transmission section or the neutral density filter section of the tunable filter inside the optical path of the optical beam and reflection optical beam,
   wherein the intensity of the optical beam from the light source and the filter drive section are controlled to emit a predetermined level of the optical beam to the optical disc.

2. The optical pickup according to claim 1, wherein the filter drive section positions the neutral density filter section in the optical path of the optical beam and reflection optical beam during a reproduction process such that the optical beam emitted to the optical disc is less powerful than that of a recording process.

3. The optical pickup according to claim 1, wherein the neutral density filter section reduces the intensity of the optical beam by polarizing part of the optical beam in a direction different from a direction of the optical beam moving toward the objective lens.

4. The optical pickup according to claim 1, wherein the optical pickup supports optical discs having one signal recording layer and optical discs having a plurality of signal recording layers.

5. The optical pickup according to claim 4, wherein
   the filter drive section positions the neutral density filter section in the optical path of the optical beam and reflection optical beam during a process in which an amount of the optical beam emitted to the optical disc is lower than a predetermined intensity while positioning the neutral density filter section outside of the optical path of the optical beam and reflection optical beam during a process in which an amount of the optical beam emitted to the optical disc is higher than a predetermined intensity.

6. An optical disc apparatus comprising:
   a light source to emit a linearly polarized optical beam;
   an objective lens to collect and irradiate the optical beam to an optical disc and to receive a reflection optical beam reflected from the optical disc, the objective lens being fixed within an optical path of the optical beam and reflection optical beam;
   a beam splitter to divide the optical beam and the reflection optical beam;
   a quarter wave plate to transform the optical beam from the beam splitter into a circularly polarized optical beam and to transform the reflected circularly polarized optical beam into an optical beam perpendicularly polarized with respect to the reflection optical beam;
   a light detector to receive the divided reflection optical beam;
   a tunable filter to direct the optical beam to the objective lens and to irradiate the reflection optical beam to the light detector, the tunable filter including
      a high transmission section to maintain the intensity of both the optical beam and the reflection optical beam through entire surface areas of each of at least two sides of the high transmission section, and
      a neutral density filter section to reduce the intensity of the optical beam using a difference of polarization directions between the optical beam and the reflection optical beam while maintaining the intensity of the reflection optical beam;
   a filter drive section to position the high transmission section or the neutral density filter section of the tunable filter inside the optical path of the optical beam and reflection optical beam; and
   an emission light intensity control section to control the intensity of the optical beam from the light source and the filter drive section to emit a predetermined level of the optical beam to the optical disc.

7. The optical pickup according to claim 1, wherein the filter drive section positions the high transmission section in the optical path of the optical beam and reflection optical beam during a recording process to emit a more powerful optical beam than that of a reproduction process.

8. The optical pickup according to claim 1, wherein the high transmission section is a prism substantially shaped as a cube.

9. The optical pickup according to claim 1, wherein the neutral density section is a combination of two triangular prisms to form a polarization plane therebetween.

10. An optical pickup method for recording and reproducing information, the optical pickup method comprising:
    emitting, at a light source, a linearly polarized optical beam;
    collecting and irradiating, at an objective lens, the optical beam to an optical disc;
    receiving, at the objective lens, a reflection optical beam reflected from the optical disc, the objective lens being fixed within an optical path of the optical beam and reflection optical beam;
    dividing, at a beam splitter, the optical beam and the reflection optical beam;
    transforming, at a quarter wave plate, the optical beam from the beam splitter into a circularly polarized optical beam and the reflected circularly polarized optical beam into an optical beam perpendicularly polarized with respect to the reflection optical beam;
    receiving, at a light detector, the divided reflection optical beam;
    directing, at a tunable filter, the optical beam to the objective lens and irradiating, at the tunable filter, the reflection optical beam to the light detector, the tunable filter including
        a high transmission section to maintain the intensity of both the optical beam and the reflection optical beam through entire surface areas of each of at least two sides of the high transmission section, and
        a neutral density filter section to reduce the intensity of the optical beam using a difference of polarization directions between the optical beam and the reflection optical beam while maintaining the intensity of the reflection optical beam;
    positioning, at a filter drive section, the high transmission section or the neutral density filter section of the tunable filter inside the optical path of the optical beam and reflection optical beam; and
    controlling, at an emission light intensity control section, the intensity of the optical beam from the light source and the filter drive section to emit a predetermined level of the optical beam to the optical disc.

* * * * *